N. M. BAKER.
EYEGLASSES.
APPLICATION FILED FEB. 13, 1911.
1,039,069.
Patented Sept. 17, 1912.
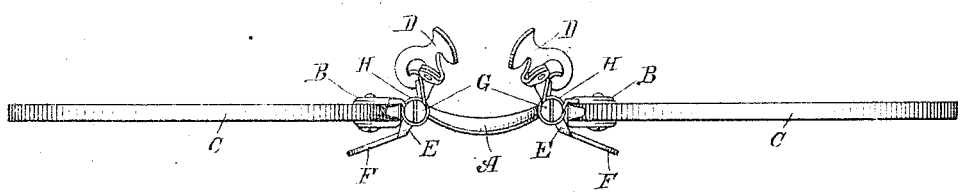
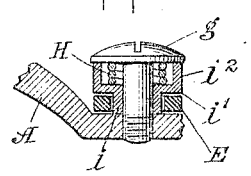 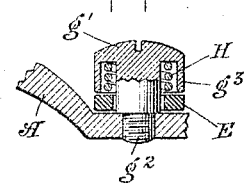
WITNESSES
INVENTOR
NELSON M. BAKER
ATTORNEYS

UNITED STATES PATENT OFFICE.

NELSON M. BAKER, OF SOUTHBRIDGE, MASSACHUSETTS, ASSIGNOR TO AMERICAN OPTICAL COMPANY, OF SOUTHBRIDGE, MASSACHUSETTS, A CORPORATION OF MASSACHUSETTS.

EYEGLASSES.

1,039,069.  Specification of Letters Patent.  Patented Sept. 17, 1912.

Original application filed October 10, 1908, Serial No. 457,119. Divided and this application filed February 13, 1911. Serial No. 608,290.

*To all whom it may concern:*

Be it known that I, NELSON M. BAKER, a citizen of the United States, and resident of Southbridge, county of Worcester, and State of Massachusetts, have invented certain new and useful Improvements in Eyeglasses, of which the following is a specification.

My invention relates to finger piece eyeglasses provided with pivoted, spring-pressed nose clamps and has for its principal object to render such glasses more sightly by proving an improved form of housing for said spring.

Other incidental objects will appear as the specification proceeds.

This application is a division of a prior application filed by me October 10, 1908, No. 457,119.

Referring to the drawings, Figure 1 is a plan view of a pair of eye glasses as described with my invention applied thereto; Fig. 2 is an enlarged central section taken through the center of the pivot screw showing one form of my invention; and Fig 3 is a similiar view showing a modified form of my invention.

Referring to Figs. 1 and 2 the nose bridge A has lens clamps B secured to each of its ends, to which are fastened the lenses C. Nose clamps D serve to maintain the glasses in position on the nose and are provided with arms E which terminate in operating finger pieces F. Screws G having shanks of even diameter throughout extend into the nose bridge A, each screw being surrounded by a sleeve $i$ having a shoulder $i'$ and an upwardly extending tubular member or circumferential flange $i^2$ which forms a chamber in which the coil spring H is located and concealed. The arms E are perforated to receive the sleeve $i$ and this sleeve is held in position against the bridge by having the head of screw G bear against the upper edge of the portion $i^2$. Suitable openings are left in the flange $i^2$ through which the one end of the spring H may be projected so as to abut against the lens clamp B and the other end to engage the arm E. The tendency of this spring is to press the nose clamps D toward each other so that a pressure is exerted on the nose of the wearer for maintaining the glasses in position. Spring H may of course have its fixed end, instead of abutting against the lens clamp B, engaged with or abutting any other fixed element of the eye glasses, as for example the pivot screw itself or some fixed parts associated with it.

Referring to Fig. 3, the shank of screw $g'$ is provided with a reduced screw-threaded portion $g^2$ which screws into the nose bridge A while the shank proper forms the pivot for the arm E. The head of the screw is provided with a dependent tubular member or circumferential flange $g^3$ which engages the upper surface of the arm E. This arm E in this form is therefore held between said flange $g^3$ and the nose bridge A, the spring H being contained and concealed in the annular space or chamber formed by the flange $g^3$ the head $g'$ and the arm E. In this form also there are provided suitable openings in said flange $g^3$ through which the ends of spring H project.

Various modifications may be made without departing from the scope of my invention as defined in the following.

I claim:

1. In eyeglasses, the combination with the bridge, of a nose clamp, a pivot upon which it swings, a tubular member separable from said bridge central with said pivot and inclosing a chamber, a spring within said chamber, and means coöperating with said tubular member for attaching said pivot to the bridge substantially as and for the purpose described.

2. In eyeglasses, the combination with the bridge, of a nose clamp, a pivot upon which it swings, a tubular member integral with said pivot and inclosing a chamber, a spring within said chamber, and means for attaching said pivot to the bridge, substantially as and for the purpose described.

3. In eyeglasses, the combination with the bridge, of a nose clamp, a pivot upon which it swings, means provided with a head for attaching said pivot to the bridge, a tubular member inclosing a chamber reaching to said head, and a spring within said chamber, substantially as and for the purpose described.

4. In eyeglasses, the combination with the bridge, of a nose clamp, a pivot upon which it swings comprising a sleeve provided with a shoulder and an upstanding tubular member, and a pivot screw provided with a threaded end and a head adapted to bear against the top of said tubular member said screw being spaced from said flange so as to form a chamber for inclosing the controlling spring, substantially as and for the purpose described.

5. In eyeglasses provided with pivoted spring controlled nose clamps, a screw provided with a threaded end for engaging the bridge, a shank and a head, a sleeve upon said shank upon which the nose clamp swings, and a tubular member surrounding but spaced from said shank so as to form a chamber for inclosing the controlling spring one end of said tubular member forming a bearing for one side of the nose clamp and the other reaching to said head, substantially as and for the purpose described.

6. In eyeglasses, the combination with the bridge of a nose clamp, a pivot upon which it swings, a tubular member central with said pivot and having said nose clamp between it and the bridge, a spring surrounded by said tubular member, and means coöperating with and holding said tubular member in place.

7. The combination with a support for lenses and a nose guard mounted to swing thereon, of a screw threaded device on one of the first two named parts forming a bearing for the other, a coil spring arranged about the screw threaded device, and a device engaging said screw threaded device and coöperating with one of the first two named devices to inclose the spring.

In testimony whereof I have hereunto set my hand and seal in the presence of two subscribing witnesses.

NELSON M. BAKER. [L. S.]

Witnesses:
 MARTIN S. LOUGHNAN,
 HARRY H. STYLT.

---

Copies of this patent may be obtained for five cents each, by addressing the "Commissioner of Patents, Washington, D. C."